US012498175B2

(12) United States Patent
Reynaud et al.

(10) Patent No.: US 12,498,175 B2
(45) **Date of Patent: *Dec. 16, 2025**

(54) REFRACTORY ANCHORS AND EYE-MOUNTS

(71) Applicant: Brand Shared Services LLC, Atlanta, GA (US)

(72) Inventors: Spencer Andrew Reynaud, Edmonton (CA); Cody William Douglas Burton, Edmonton (CA); Todd Christopher Malo, Westerose (CA); Eduardo Fernando D'Oracio De Almeida, League City, TX (US)

(73) Assignee: Brand Shared Services LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,332

(22) Filed: Jun. 14, 2024

(65) Prior Publication Data

US 2024/0328715 A1 Oct. 3, 2024

Related U.S. Application Data

(63) Continuation of application No. 17/845,381, filed on Jun. 21, 2022, now Pat. No. 12,044,477.

(60) Provisional application No. 63/320,452, filed on Mar. 16, 2022.

(51) Int. Cl.
*F27D 1/14* (2006.01)
*F23M 5/04* (2006.01)

(52) U.S. Cl.
CPC ............... *F27D 1/141* (2013.01); *F23M 5/04* (2013.01)

(58) Field of Classification Search
CPC .................................. F27D 1/141; F23M 5/04
See application file for complete search history.

(56) References Cited

U.S. PATENT DOCUMENTS 1,902,459 A * 3/1933 Miller ..................... F16G 11/06 24/115 J
2,587,882 A * 3/1952 Oakley ................ B61D 45/001 16/221
3,233,319 A * 2/1966 Jensen ................. B61D 45/001 410/108
3,657,851 A * 4/1972 Chambers ............... F27D 1/141 52/378
3,709,455 A * 1/1973 Last ..................... B61D 45/007 410/85
3,845,527 A * 11/1974 Lombardi ............... B66C 1/663 24/575.1
4,068,878 A * 1/1978 Wilner .................... B66C 1/663 29/559

(Continued)

FOREIGN PATENT DOCUMENTS

FR 2894654 A1 6/2007

*Primary Examiner* — Joshua K Ihezie
(74) *Attorney, Agent, or Firm* — Foley & Lardner LLP

(57) ABSTRACT

An eye mount for a refractory anchor includes a mounting base and an attachment head extending from the mounting base. The attachment head includes a through-hole and a saddle channel. The saddle channel includes two side portions formed integrally with the attachment head, and a curved portion between the two side portions. The curved portion is formed integrally with the attachment head.

20 Claims, 11 Drawing Sheets

(56) References Cited

U.S. PATENT DOCUMENTS

| | | | | | |
|---|---|---|---|---|---|
| 4,179,151 | A * | 12/1979 | Tye | E04G 21/142 | 52/707 |
| 4,925,226 | A * | 5/1990 | Leonard, Jr. | B66C 1/663 | 294/102.1 |
| 5,862,641 | A * | 1/1999 | Miskolczi, Jr. | F27D 1/141 | 432/252 |
| 6,334,286 | B1 * | 1/2002 | Zambelli | B66C 1/666 | 52/707 |
| 7,065,925 | B2 * | 6/2006 | Hansort | E04G 21/142 | 294/215 |
| 7,621,706 | B2 * | 11/2009 | Early | B60P 7/0807 | 410/116 |
| 8,469,643 | B2 * | 6/2013 | Early | B61D 45/001 | 410/116 |
| 8,844,239 | B2 * | 9/2014 | Garot | E04B 1/41 | 52/340 |
| 10,207,902 | B2 * | 2/2019 | Bradshaw | B66C 1/66 | |
| 12,044,477 | B2 * | 7/2024 | Reynaud | F27D 1/141 | |
| 2009/0324357 | A1 * | 12/2009 | Early | B60P 7/0807 | 410/107 |
| 2012/0291393 | A1 | 11/2012 | Garot | | |

* cited by examiner

REFRACTORY ANCHORS AND EYE-MOUNTS

CROSS-REFERENCE TO RELATED APPLICATION

This application is a continuation of U.S. patent application Ser. No. 17/845,381, filed Jun. 21, 2022, which claims the benefit of and priority to U.S. Provisional Patent Application No. 63/320,452, filed Mar. 16, 2022, each of which is hereby incorporated herein by reference.

TECHNICAL FIELD

The present invention relates generally to the field of refractory linings for high-temperature vessels used in industrial and chemical processes, and more particularly to anchor systems for holding refractory materials in place in high-temperature and abrasive environments.

BACKGROUND

Thermal-process vessels used in petrochemical and chemical process facilities have highly abrasive and high-temperature environments. To protect the vessel shells (e.g., sidewalls), their internal surface is typically lined with a refractory material such as a layer of ceramic material. To secure the refractory material in place, anchoring devices have been developed.

One common type of anchoring device includes an eyebolt that mounts to the thermal vessel wall and a V-anchor that can be routed and through the eyebolt and held fixedly in place. These V-anchor systems have some nice advantages, but they also have significant limits.

Accordingly, it can be seen that needs exist for improvements anchoring devices and methods for refractory linings for thermal vessels. It is to the provision of solutions to these and other problems that the present invention is primarily directed.

SUMMARY

Generally described, the present invention relates to an anchoring assembly for a refractory material for a protected surface that includes a V-anchor and an eye-mount. The eye-mount mounts to the protected surface, the V-anchor mounts to the eye-mount, and the refractory material is applied and anchored to the V-anchor. The eye-mount includes a through-hole, and a saddle channel in communication with the through-hole, that are configured to receive and seat the V-anchor through the through-hole and into the saddle channel with a snap-fit connection.

In some embodiments, the V-anchor is seated with a tight snap-fit connection that holds the V-anchor in an upright use position, and in other embodiments the V-anchor includes a spacer that provides the tight snap-fit connection and that is removable in-situ after application of the refractory material to convert the tight snap-fit connection to a floating snap-fit connection.

Some embodiments include the eye-mount for use with the V-anchor, other embodiments include the V-anchor with the spacer for use with the eye-mount, and still other embodiments include an assembly of the eye-mount and the V-anchor (with or without the spacer) for use together. Additional embodiments include methods of installing the eye-mounts and V-anchors to protect the protected surface from high temperatures during use.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

Figure 1:
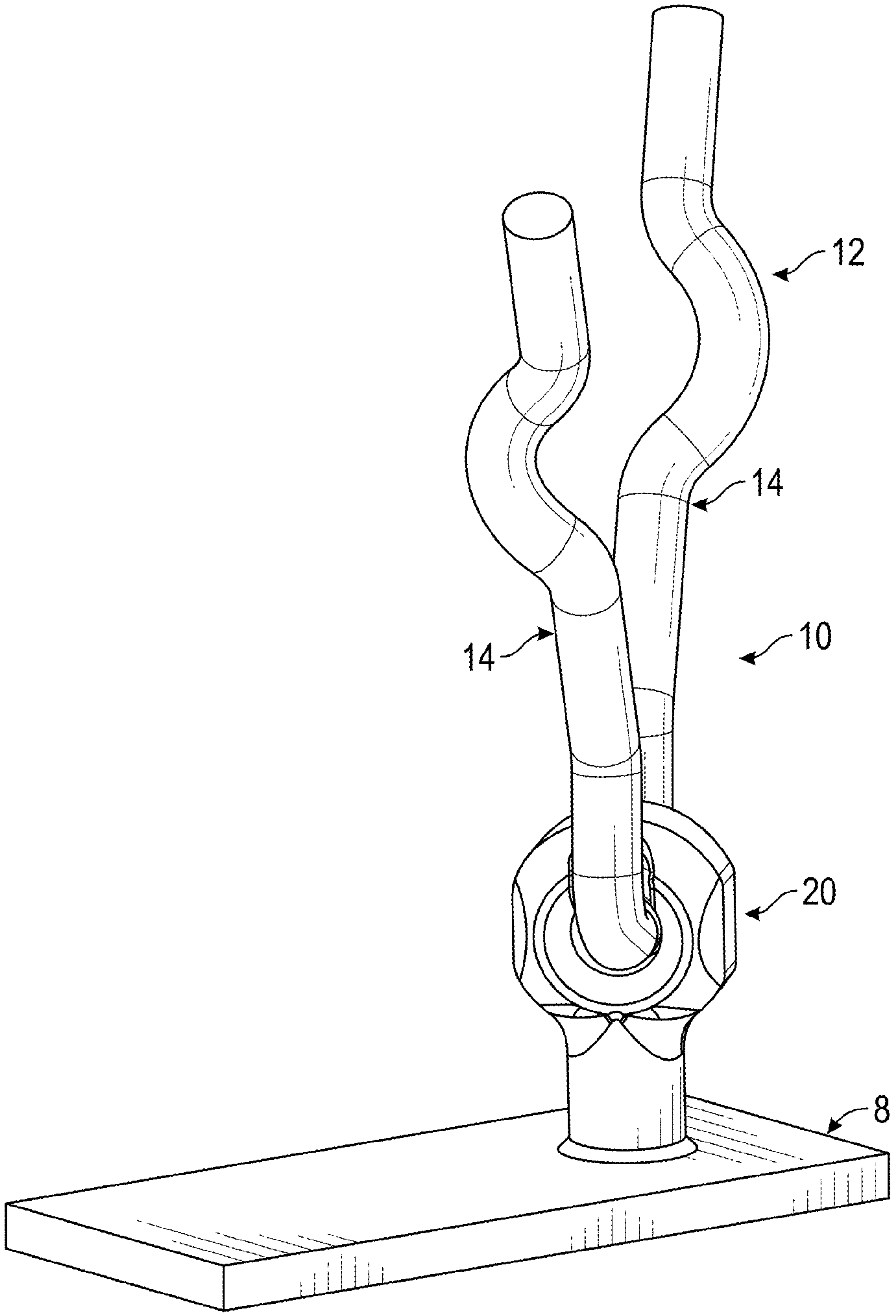
FIG. 1 is a top perspective view of a refractory anchoring assembly, including an eye-mount with a V-anchor mounted to it, according to a first example embodiment of the invention, showing the refractory anchoring assembly mounted to a thermal vessel.

Generally described, the present invention relates to an anchoring assembly, and an eye-mount device of such an anchoring assembly, for anchoring a refractory lining to form a protective barrier system for a surface such as a wall (shell) of a thermal vessel. The anchoring assembly can be used for protecting thermal vessels such as high-temperature cyclone separators (e.g., fluid catalytic crackers aka FCCs), burners, furnaces, columns, and tanks, piping for these, and other high-temperature industrial-process containers. These thermal vessels operate at high temperatures of typically about 250 C to about 1800 C and are typically made of a metal such as steel. The anchoring assembly can be used for protecting such thermal vessels in oil refineries, other petrochemical-process facilities, chemical-process facilities, chemical-manufacturing plants, cement plants, fertilizer plants, steel mills, pulp-and-paper plants, power-generating plants, and other facilities and industries using such high-temperature vessels. And the anchoring assembly can be used for anchoring refractory materials including concrete, cement, fibers, plastics, ceramics, and/or other conventional refractories, typically applied in a viscous state and cured on site into a solid state, but in some embodiments precast or otherwise pre-formed.

FIGS. 1-8D show a refractory anchoring assembly 10 according to a first example embodiment. The refractory anchoring assembly 10 installs onto a thermal vessel wall (shell) 8 and includes a V-anchor 12 that retains a refractory lining material (not shown) and that attaches to an eye-mount 20, which in turn mounts to the thermal vessel 8. The thermal vessel wall 8 can be made of for example plates or sheets of steel or another conventional metal.

Referring particularly to FIGS. 1 and 5-7, the V-anchor 12 is an elongated element formed into two upstanding arm segments 14 and a connecting segment 16 between them to have the general shape of a "V." The V-anchor 12 can be of a conventional type and made of a conventional metal (e.g., steel) material using conventional fabrication techniques and equipment. the elongated element forming the V-anchor is typically a rod (circular in cross-section) though in other embodiments it can have another regular (e.g., polygonal) or irregular cross-sectional shape.

Figure 5:
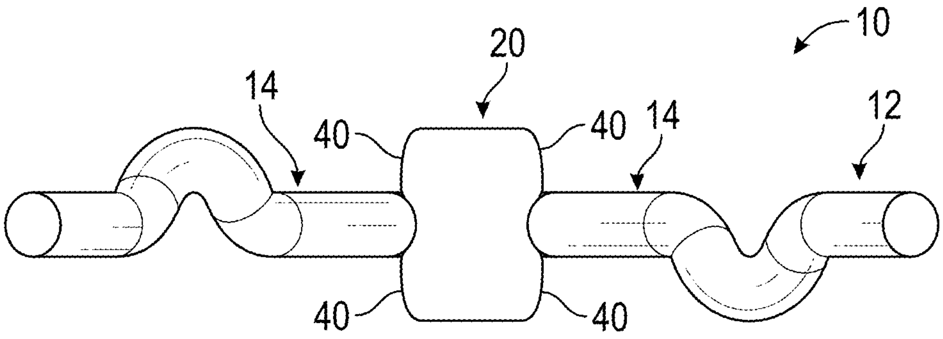
FIG. 5 is a top view of the refractory anchoring assembly of FIG. 1.
Figure 6:
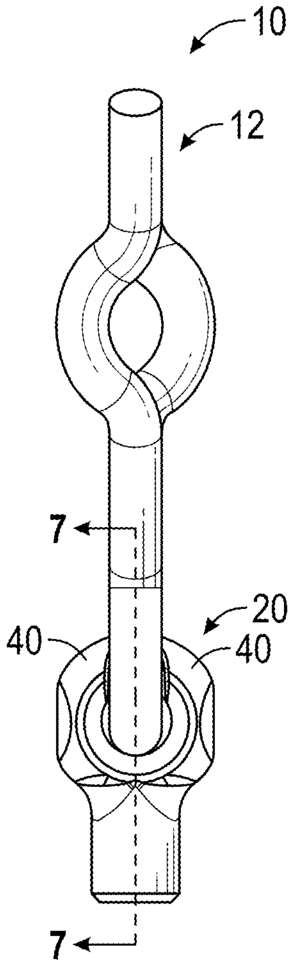
FIG. 6 is a side view of the refractory anchoring assembly of FIG. 1.

The arm segments 14 of the V-anchor 12 engage and retain the refractory material to hold/anchor it in place. To provide increased contact surface area for this retaining purpose, the arm segments 14 can include bends (FIG. 1), but otherwise be coplanar (FIGS. 5-6). In other embodiments, the arm segments have other bends, curves, angles, etc., they are linear, and/or they are not coplanar, as may be desired for a particular application. As such, the V-anchor 12 is generally V-shaped in the broad sense of having two upstanding arm segments 14 extending upward and outward from a connecting segment 16, can include variations in shape from strictly V-shaped, and expressly includes Y-shaped anchors (i.e., V-shaped with a modified connecting segment) and U-shaped anchors (i.e., with the arm segments extending upward but not or only minimally outward).

The connecting segment 16 is U-shaped and defines a curved notch 17 (FIGS. 7 and 8A) formed by a middle bend segment 18 and two legs 19 extending upward from it. The V-anchor 12 inter-engages with the eye-mount 20 in a snap-fit joint, as described further below, with the curved notch 17 functioning as a socket of the snap-fit joint. In typical embodiments, the V-anchor 12 is configured with a size (e.g., thickness and length), shape (e.g., circular cross-section), and a material selection (e.g., stainless steel) so that the two arm segments 14 are resiliently deflectable relative to each other to enable the snap-fit connection, as described further below.

Figure 2:
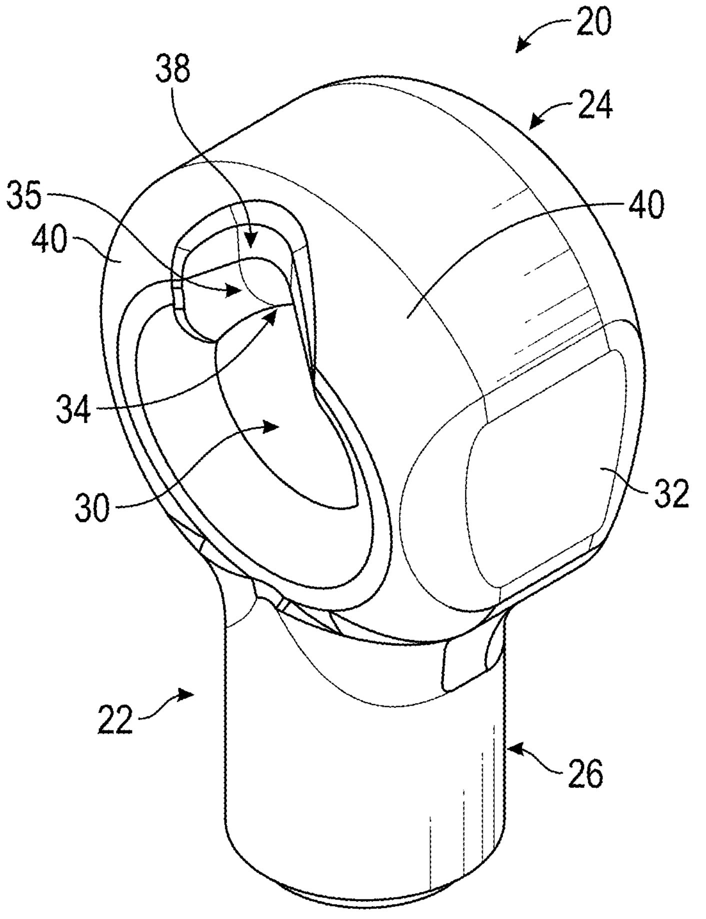
FIG. 2 is a top perspective view of the eye-mount of FIG. 1.
Figure 3:
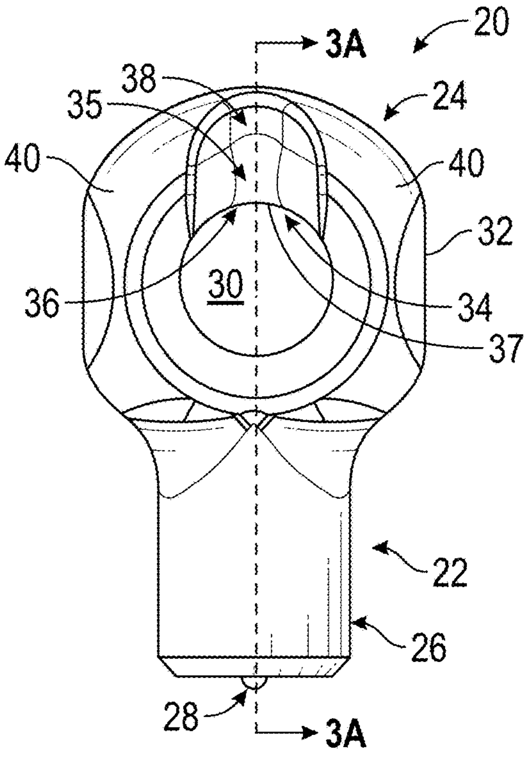
FIG. 3 is a side view of the eye-mount of FIG. 2.
Figure 4:
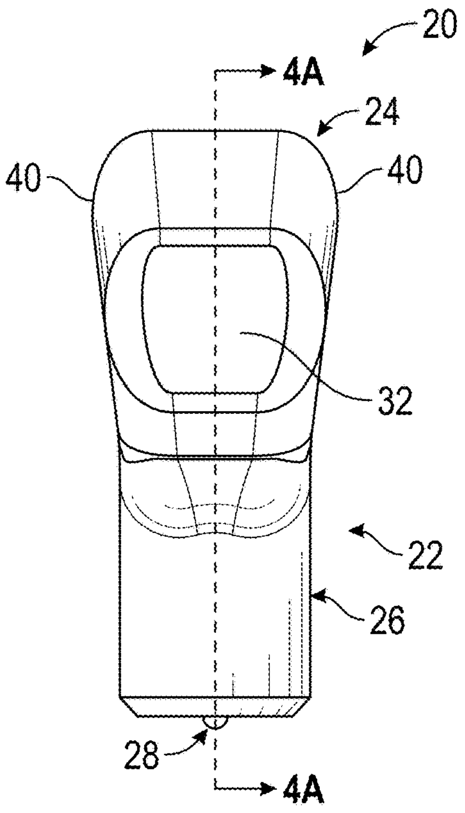
FIG. 4 is an end view of the eye-mount of FIG. 2.

Referring further to FIGS. 2-4, the eye-mount 20 includes a mounting base 22 and an attachment head 24 extending from the mounting base 22. The mounting base 22 mounts to the thermal vessel wall 8 and the attachment head 24 is configured for mounting the V-anchor 12 to it. The eye-mount 20 can be made of a conventional material (e.g., steel) using conventional fabrication equipment and techniques (e.g., casting).

Figure 4A:
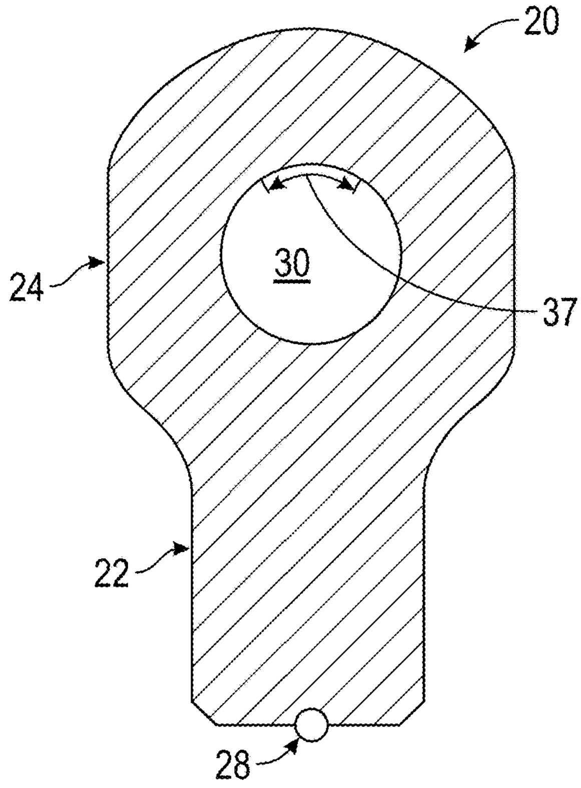
FIG. 4A is a cross-sectional side view of the eye-mount taken at line 4A-4A of FIG. 3.

In the depicted embodiment, the refractory anchoring assembly 10 is designed for conventional stud welding to a metal (e.g., steel) thermal vessel 8. As such, the mounting base 22 includes a stud (e.g., a cylinder) 26 having a bottom-surface recess (e.g., a semi-spherical tap hole) for receiving a metal interface/pilot element 28 (e.g., a solid ball), as shown in FIGS. 3-4A. The stud 26 and the interface/pilot element 28 can have a configuration of a conventional type as is suitable for using conventional one-step stud-welding techniques and equipment, so additional details are not provided for brevity. In other embodiments, the mounting base is configured for manual welding, soldering, or other conventional anchor attachment methods.

The attachment head 24 is annular with a through-hole 30 extending side-to-side all the way through it. The annular attachment head 24 can be generally toroidal, for example as depicted, with flat end portions 32 providing a contact point during the stud-welding process.

The attachment head 24 defines/includes a saddle channel 34 that is in communication with the through-hole 30 and that receives, locates, and retains the connecting segment 16 of the V-anchor 12 in a snap-fit joint. The saddle channel 34 includes a curved through portion 36 and two side extension portions 38.

The saddle through portion 36 includes an intersecting portion 37 and two curved side portions 35 extending continuously and smoothly from the sides of the intersecting portion 37. The intersecting portion 37 defines an arc or curved line segment that is not inset from the remainder of the through-hole 30 and that is in communication with and forms a portion of the through-hole 30 (see FIGS. 3 and 4A). The two side portions 35 are recessed into the respective two opposing side surfaces of the attachment head 24, inset from the remainder of the through-hole 30, and in communication with the through-hole 30 (see FIGS. 2 and 3A). As such, the intersecting portion 37 and the two side portions 35 cooperatively define a semi-circular shape of the saddle through portion 36 (see FIG. 3A). The curved saddle through portion 36 typically has a generally conforming shape to the V-anchor middle bend 18 (see FIG. 7).

Figure 3A:
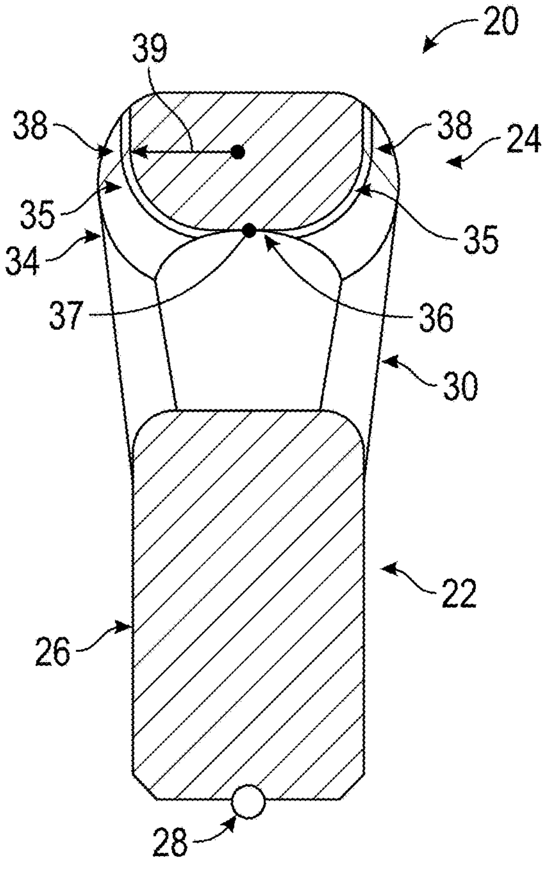
FIG. 3A is a cross-sectional end view of the eye-mount taken at line 3A-3A of FIG. 3.

In the depicted embodiment, the intersecting portion 37 is formed by the arc or curved line segment (see FIGS. 3A and 4A). It will be noted that the semi-circular (cross-sectional end view) saddle through portion 36 need not be perfectly semi-circular with a constant/same radius along its entire arc length. Instead, the through portion 36 can be slightly flattened at the intersecting portion 37 and thus oblong (see FIG. 3A), and in some embodiments the flattening can result in the intersecting portion being a planar area including the depicted arc or curved line segment.

Further, the two side extensions 38 of the saddle channel 34 extend continuously and smoothly from the respective two side portions 38 of the saddle channel 34 and are recessed into the respective two opposing side surfaces of the attachment head 24, with the side extensions 38 thus inset from the outer surface of the head 24. The U-shaped saddle channel 34 typically has a generally conforming shape to the V-anchor connecting segment 16 (see FIG. 7). In the depicted embodiment, for example, the saddle channel 34 defines smooth, continuous, linear side extensions 38 extending upward through both sides of an upper portion of the annular head 24 and spaced apart (in a generally parallel or mirrored arrangement) by twice the radius of the through portion 36 from which they extend (see FIG. 3A). The side extensions 38 thus deviate from the curvature of the through portion 36 to define a "U" shape of the saddle channel 34, and thus to provide axial mechanical interference functionality as described in detail below. In other embodiments, the side extensions can be slightly curved, but with a greater radius of curvature than the through portion 36, while still providing the axial mechanical interference functionality described herein.

The depicted saddle through portion 36 is semi-toroidal in 3D shape, with a semi-circular profile (cross-sectional) shape (see FIG. 3A) that is extended through 180 degrees to form half a toroid shape. The saddle through portion 36 is generally semi-toroidal, meaning it need not be perfectly semi-toroidal and instead can be slightly oblong or flattened, for example as discussed above and shown in FIG. 3A. The semi-toroidal saddle through portion 36 (with its generally semi-circular profile shape) enables receiving a rod-shaped V-anchor 12 with a circular profile (cross-sectional) shape so the parts are seated together with a flush fit. Further, the continuously smoothly curved surfaces of the saddle channel 34 eliminate or minimize any sharp points, thereby reducing stress concentration points and enabling a smooth pass-through of the V-anchor 12. In other embodiments, the saddle through portion can have other profile/cross-sectional shapes for use with V-anchors having other profile/cross-sectional shapes, with continuously smoothly curved surfaces or not. In still other embodiments, the saddle channel can extend laterally through both side of a middle portion of the head (subjacent the upper portion) for receiving a V-anchor with a laterally oriented connecting segment and upward-extending arm segments.

The side portions 35 and the side extensions 38 of the saddle channel 34 can be formed at least in part by the attachment head 24 being oversized or enlarged at protruding portions 40 adjacent the side portions 35 and the side extensions 38. With the V-anchor 12 seated into the saddle channel 34, the adjacent protruding portions 40 of the attachment head 24 create angular mechanical interference with the V-anchor 12 to retain it in place from angular movement about the centerline of the through-hole 30. In the depicted embodiment, for example, the upper adjacent protruding portions 40 of both sides of the attachment head 24 are flared outward and upward, so that the side portions 35 and the side extensions 38 of the saddle channel 34 are inset/recessed relative to them. The flared portions 40 provide extra material so that, with the saddle channel 34 formed into the attachment head 24, the strength and structural integrity of the eye-mount 40 is not compromised. In other embodiments, the attachment head has a uniform enlarged thickness, with the saddle-adjacent portions still protruding relative to the side-recess portions of the saddle channel, but also with the non-adjacent portions (e.g., the lower portion of the attachment head) being larger than needed and thus including more material than needed.

Figure 7:
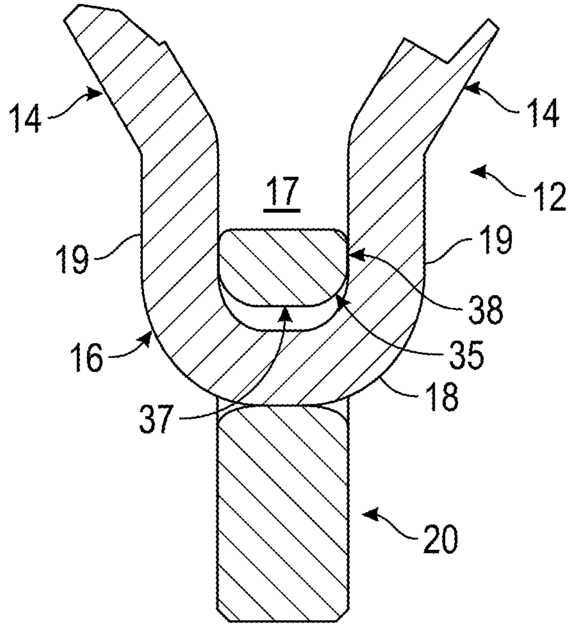
FIG. 7 is a cross-sectional view of a portion of the refractory anchoring assembly taken at line 7-7 of FIG. 6.

Accordingly, the saddle channel 34 is configured (shaped and sized) to receive and retain the connecting portion 16 of the V-anchor 12 in place with a tight fit so that the V-anchor 12 is held in a fixed upright use position. That is, there is no (i.e., no more than functionally negligible) "play" or slight movement between the V-anchor 12 and the eye-mount 20 when the V-anchor 12 is installed in place onto the eye-mount (FIGS. 5-7).

To enable a quick and easy manual installation of the V-anchor 12 onto the eye-mount 20, the saddle channel 34 includes additional special geometry that provides the tight snap-fit connection. In particular, the through-hole 30 of the attachment head 24 has a transverse dimension (e.g., a radius) that is slightly larger than a transverse dimension (e.g., radius) of the V-anchor 12 (including its connecting segment 16). This enables the V-anchor 12 to pass through and be received in the through-hole 30 in its mounted position, and this retains the V-anchor 12 in place from moving in the plane perpendicular to the centerline of the through-hole 30 (i.e., from moving up-and-down or side-to-side). But this by itself does not retain the V-anchor 12 in place from all movement, as the V-anchor 12 might still be able to move angularly about the centerline of the through-hole 30. However, the protruding adjacent portions of the head 24 the provide angular mechanical interference with the connecting portion 16 of the V-anchor 12 that retains it from angular movement about the centerline of the through-hole 30.

In addition, to enable the quick and easy manual installation, and also to retain the V-anchor 12 from moving axially along the centerline of the through-hole 30 (i.e., from moving out of the through-hole 30 the way it was moved into the through-hole 30), the side extensions 38 extend from the through portion 36 of the saddle channel 34 to provide axial mechanical interference with the U-shaped connecting segment 16 during installation into the through-hole 30. The through portion 36 of the saddle channel 34 is semi-circular in a cross-sectional end view, with a radius 39 that also defines the lateral thickness of the head 24 between the side-recess portions 38 of the saddle channel 34 (see FIG. 3A). Thus, the saddle channel 34 is U-shaped in a cross-sectional end view, with the semi-circular through portion 36 extended by the side extensions 38 into the U shape. The semi-circular cross-section of the through portion 36 need not be strictly/perfectly semi-circular, as its intersection with the arc segment 37 of the through-hole 30 can be somewhat oblong or flattened by the shape of the arc segment 37 (see FIGS. 3, 3A, and 4A) as noted above, and thus semi-circular as used herein to describe the cross-sectional through portion 36 as including minor variation such as this. The U-shaped saddle channel 34 thus mates with the U-shaped connecting segment 16 of the V-anchor to secure the V-anchor 12 in place. The middle bend portion 18 of the U-shaped connecting segment 16 can a slightly larger radius than the through portion 36 of the saddle channel 34, and the leg portions 19 of the U-shaped connecting segment 16 can have a slightly larger spacing than the side extensions 35 of the saddle channel 34. In this way, the side-recess extensions 38 of the attachment head 24 provide axial mechanical interference with the leg portions 19 of the U-shaped connecting segment 16 of the V-anchor 12 when inserting or removing the V-anchor 12 relative to the through-hole 30.

Figure 8A:
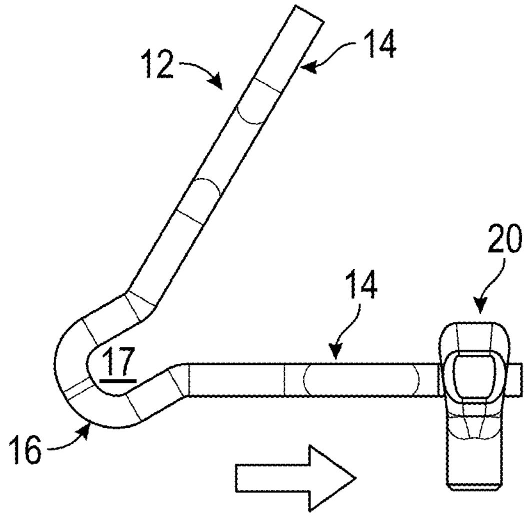
FIGS. 8A-8D are end views of the refractory anchoring assembly of FIG. 1, showing sequential installation steps for mounting the V-anchor to the eye-mount with a tight snap-fit joint.
Figure 8B:
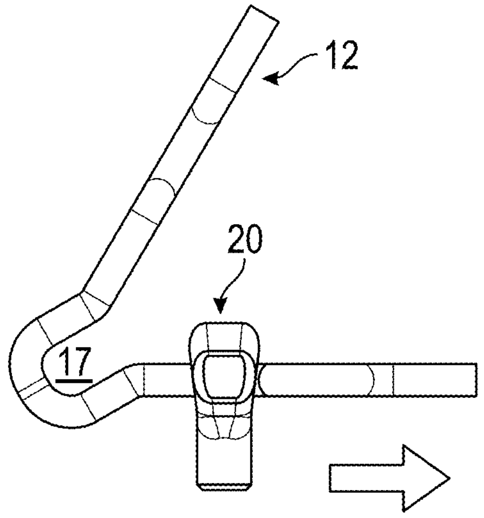
Figure 8C:
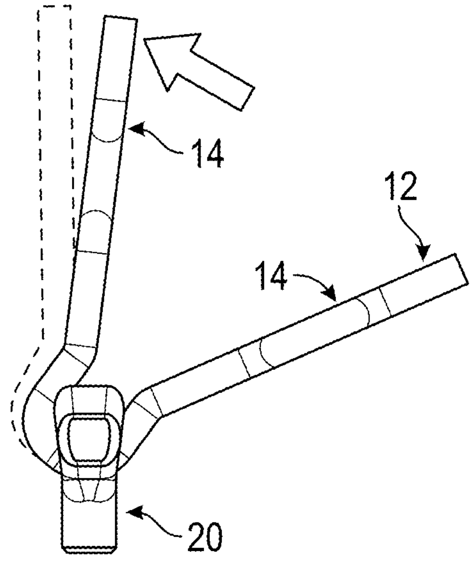
Figure 8D:
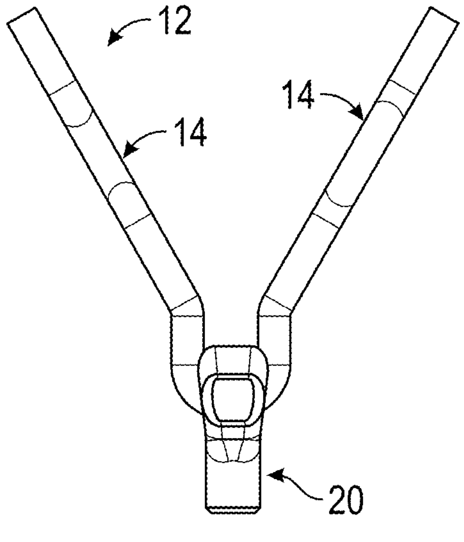
Figure 9:
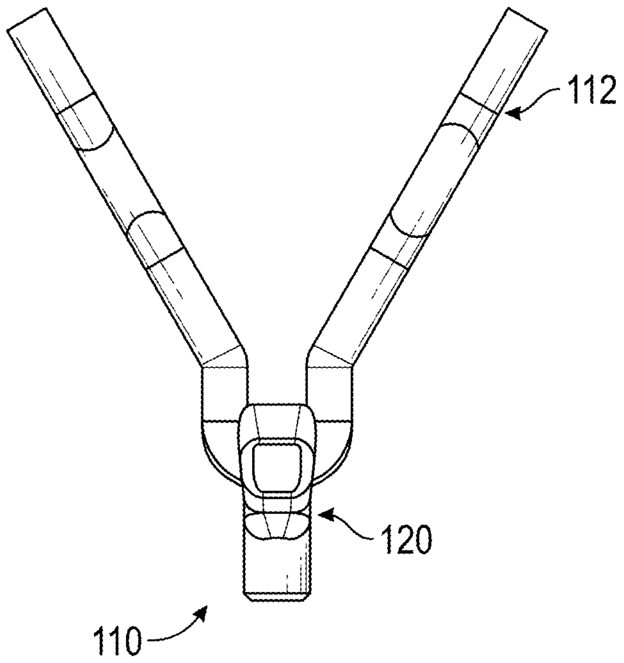
FIG. 9 is an end view of a refractory anchoring assembly, including an eye-mount with a V-anchor mounted to it, according to a second example embodiment of the invention.
Figure 10:
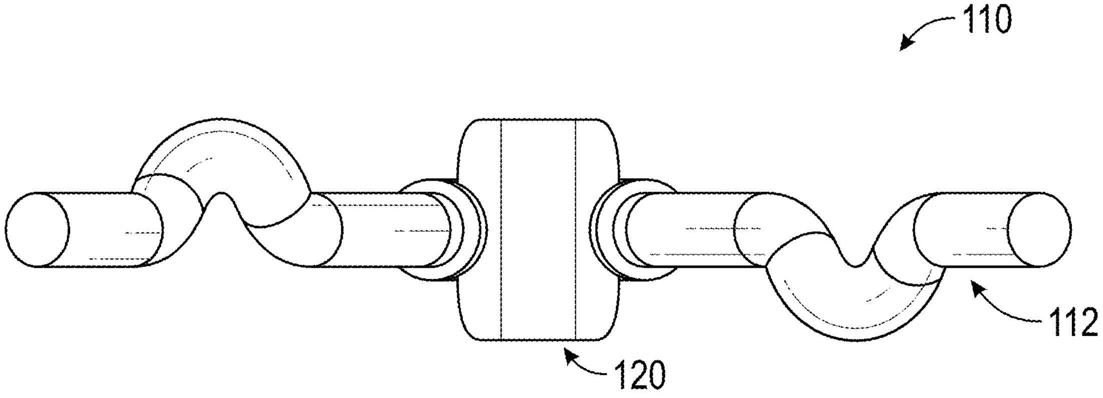
FIG. 10 is a top view of the refractory anchoring assembly of FIG. 9.
Figure 11:
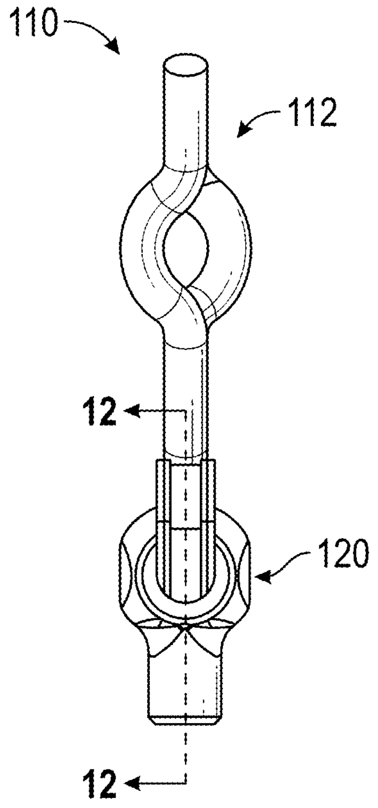
FIG. 11 is a side view of the refractory anchoring assembly of FIG. 9.
Figure 12:
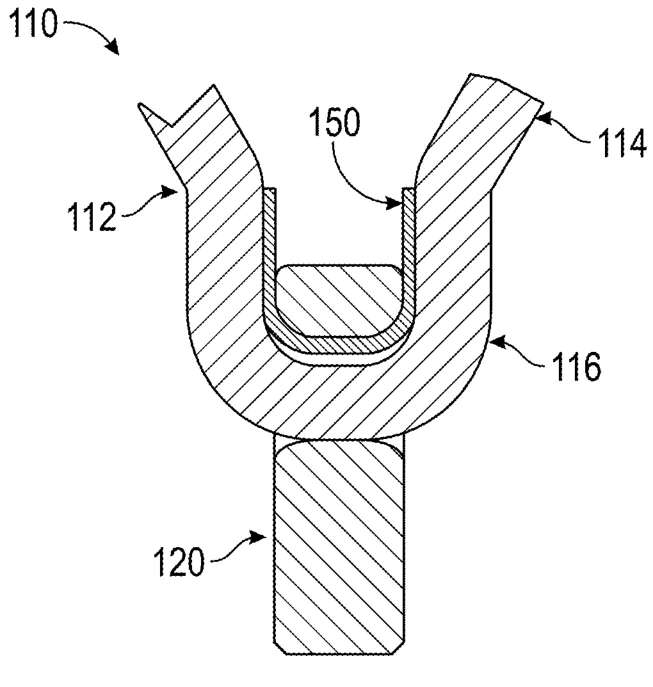
FIG. 12 is a cross-sectional view of a portion of the refractory anchoring assembly taken at line 12-12 of FIG. 11.

Referring particularly to FIGS. 8A-8D, to install the V-anchor 12 onto the eye-mount 20, one of the anchor arms 14 is inserted into and through the through-hole 30 of the eye-mount 20, as indicated by the directional arrow in FIGS. 8A-8B. The V-anchor 12 is advanced until the U-shaped connecting portion 16 of the V-anchor 12 is received in the through-hole 30 and the axial mechanical interference (described above) prevents further advancement, as shown in FIG. 8C. Then the installer applies a force (as indicated by the angular directional arrow of FIG. 8C) to the non-inserted leg 14 of the V-anchor 12, while the inserted leg 14 is retained from moving in the same direction by engagement with the eye-mount 20, to cause the non-inserted leg to resiliently deflect away (as indicated by the phantom lines of FIG. 8C). This results in the anchors arms 14 being resiliently deflected and spread apart to widen the U-shaped connecting portion 16 sufficiently to provide clearance to advance the V-anchor 12 until the U-shaped connecting segment 16 of the V-anchor is seated and secured with and by the U-shaped through portion 36 of the saddle channel 34, as shown in FIG. 8D. Upon releasing the applied force, the anchor arms 14 resiliently return to the original/neutral state/position to effectively clip the V-anchor 12 into its seated upright use position, as shown in FIG. 8D.

Because of the applied force being required to deflect the V-anchor 12 to remove axial mechanical interference with the eye-mount 20 and then the resilient return causing the axial mechanical interference to return, this is considered to be a snap-fit connection (this can be considered a reverse ball-and-socket snap-fit joint). And because the V-anchor 12 seats with the eye-mount 20 to permit no relative movement (i.e., none or no more than functionally negligible), this is considered to be a tight fit. As such, this results in a tight snap-fit connection. In other embodiments, the V-anchor and/or eye-mount are configured to provide a floating snap-fit connection, for example as described below.

To install a refractory lining using the refractory anchor assembly 10, an eye-mount 20 is mounted to the vessel wall 8 or other surface to be protected. A V-anchor 12 is then routed through the through-hole 30 of the eye-mount 20 and secured into place (see FIGS. 8A-8D). The process is repeated to form an array/system of the installed anchoring assemblies 10. The refractory material is then applied to the anchoring assemblies 10 and cured to form the protective refractory lining. As the refractory lining experiences thermal cycling during periods of use (extremely high heat) and non-use (no heat), the refractory lining expands and contracts. When the forces this applies to the attached V-anchor 12 are sufficiently great, they cause resilient deflection of the anchor arms 14 (which are retained in the upright use position by the snap-fit connection alone, using no additional mechanical fastening elements), which can result in slight dislodgement of the V-anchor 12 from its tight snap-fit connection to the eye-mount 20. As a result of that, the V-anchor 12 and attached refractory lining can then together move slightly relative to the eye-mount 20 to reduce cracking of the refractory that would otherwise result.

FIGS. 9-14 show a refractory anchoring assembly 110 according to a second example embodiment. The refractory anchoring assembly 110 includes a V-anchor 112 and an eye-mount 120 that can be of the same or similar design and construction as described above, except as noted.

In particular, the V-anchor 112 of this embodiment includes a removable spacer 150 on its U-shaped connection portion 116 (between its arm portions 114), as shown in FIGS. 9-12. The spacer 150 is positioned on the V-anchor 112 so that, when the V-anchor is mounted to the eye-mount 120, the spacer 150 that is positioned between the V-anchor and the eye-mount. With the spacer 150 in place, the V-anchor is held in place on the eye-mount 120 with a tight snap-fit connection. The spacer 150 is removable in situ, that is after the V-anchor 112 has been mounted into its use position on the eye-mount 120. For example, the spacer 150 can be made of a meltable material so that it can be removed by being melted away during use. For example, the spacer 150 can be made of a natural or synthetic rubber or rubberized material (e.g., applied by dipping) or another material than melts at the high temperatures subjected to during use. In this way, the spacer 150 is automatically removed, that is, without any additional human action after installation of the V-anchor and after application of the refractory material, during the normal use of the refractory anchoring assembly to protecting the protected surface from the high/increased temperatures.

Figure 13:
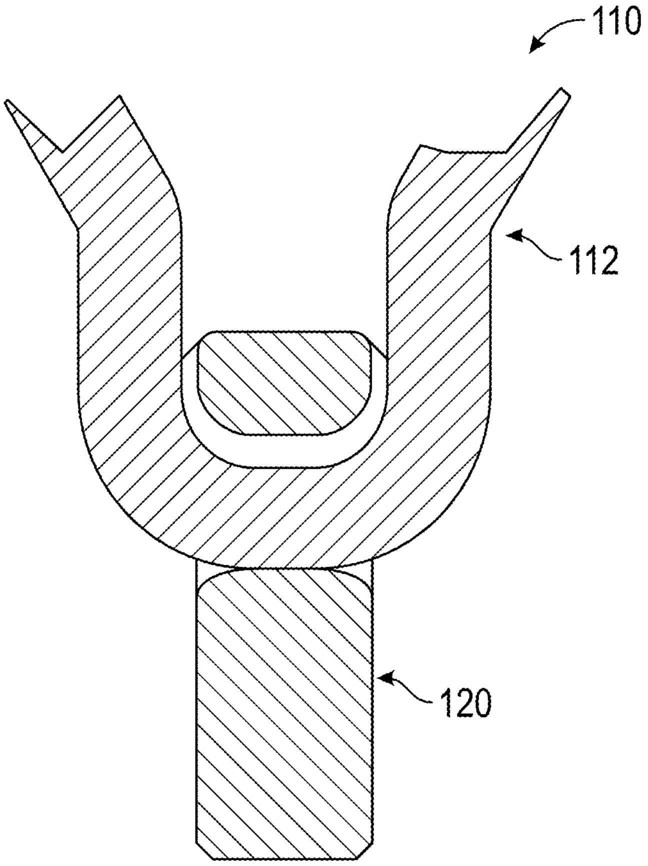
FIG. 13 shows the portion of the refractory anchoring assembly of FIG. 12 after installation.
Figure 14:
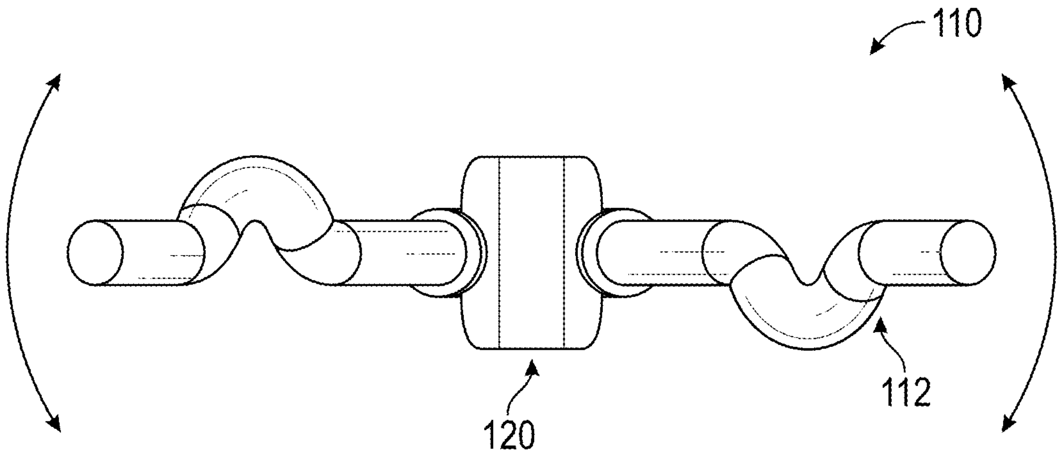
FIG. 14 is a top view of the refractory anchoring assembly of FIG. 9 after installation, showing floating snap-fit joint of the V-anchor relative to the eye-mount.

The space cleared by in-situ removal of the spacer 150 (i.e., the space it formally occupied) now provides a small amount of clearance between the V-anchor 112 and the eye-mount 120, as shown in FIGS. 13-14. This clearance is sufficient that, without the spacer 150, the V-anchor 112 would not be retained in its use position with its arms 114 extending upright, with the clearance eliminating the retaining axial and angular mechanical interference of the first embodiment. In some embodiments, the axial and/or angular mechanical interference is completely removed, so that without the refractory limiting movement of the V-anchor 112, the V-anchor could move axially removed from the eye-mount 120 and/or angularly moved in 360 degrees relative to the eye-mount. In other embodiments, axial and/or angular mechanical interference is only lessened, so that without the refractory limiting movement of the V-anchor 112, the V-anchor could move slightly axially but not removed from the eye-mount 120 and/or could be moved angularly by a few degrees only from its upright use position but not more than that.

Thus, the spacer 150 functions to help retain the V-anchor 112 in its fixed upright use position, with its arms 114 upstanding away from the eye-mount 120, until the refractory material can be applied and cured. And then afterward, when the thermal vessel is in use at high temperatures, the spacer 150 melts away to provide the clearance. This "play" or "wiggle room" enables the V-anchor 112 to have a loose or floating snap-fit connection, held in a floating upright use position, permitting it to move slightly (as indicated by the angular arrows of FIG. 14) relative to the eye-mount 120 in response to the attached refractory lining moving due to expansion and contraction during thermal cycling. This provides the significant advantage of avoiding, or at least minimizing, cracking failure of the refractory lining during use. As such, the V-anchor 112 and eye-mount are considered to have a tight snap-fit connection before the spacer 150 is removed and a floating snap-fit connection afterward.

The removable spacer 150 can be in the form of a sleeve peripherally surrounding the V-anchor 112, as depicted. For example, the spacer 150 can be cylindrical for use on a rod-shaped V-anchor, as depicted. In other embodiments, the spacer includes strips of material, is formed on the surface of the saddle channel of the eye-mount, and/or has other configurations for providing the functionality described herein. In some embodiments, the spacer sleeve 150 is made of a deformable material, for example a natural or synthetic rubber or rubberized material, that deforms when advancing the V-anchor 112 under the applied force to temporarily clear the axial and angular mechanical interference during installation onto the eye-mount 120 (e.g., whether the V-anchor resiliently deflects or not).

Figure 15:
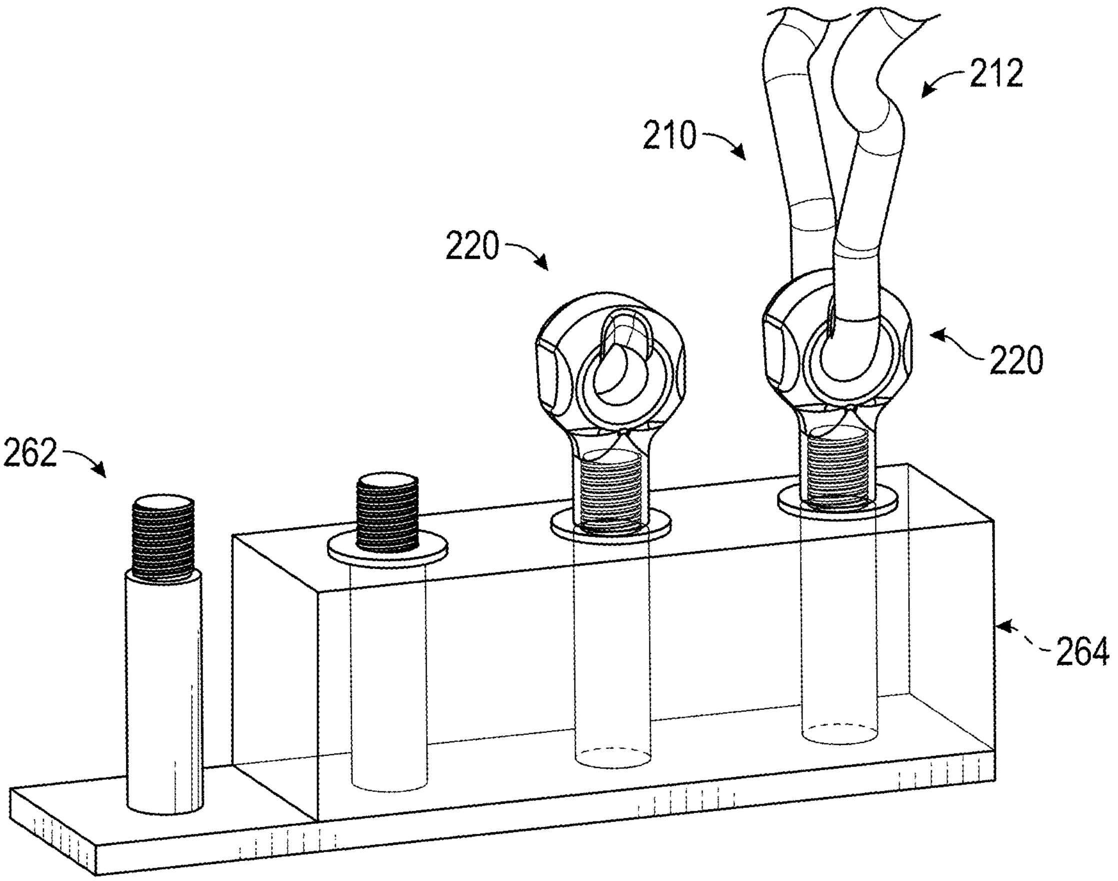
FIG. 15 is a top perspective view of a refractory anchoring assembly, including an eye-mount with a V-anchor mounted to it, according to a third example embodiment of the invention, showing the refractory anchoring assembly at different phases of installation to a thermal vessel.
Figure 16:
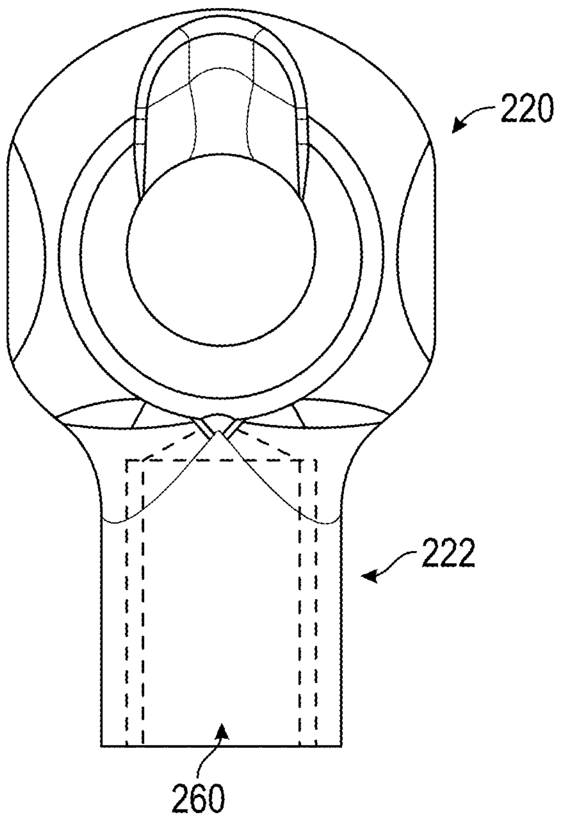
FIG. 16 is a side view of the eye-mount of FIG. 15.

FIGS. 15-16 show a refractory anchoring assembly 210 according to a third example embodiment. The refractory anchoring assembly 210 includes a V-anchor 212 and an eye-mount 220 that can be of the same or similar design and construction as described above, except as noted.

In particular, the eye-mount 220 is mounted in place by a threaded connection. For example, the mounting base 222 of the eye-mount 220 can include a threaded bore 260 that mates with a threaded stud 262. This can enable use of the anchoring assembly 210 in applications with a thicker refractory lining or a dual lining system. As shown in FIG. 15, for example, a second insulation layer 264 extends at the level of the threaded stud 262 in a dual-lining system, with the refractory lining (not depicted) yet to be installed onto the V-anchors 212.

Accordingly, very large numbers of these anchoring assemblies, including these eye-mounts, can be installed quickly and easily into large arrays, and the refractory lining material then applied, to form protective barrier systems for the thermal vessels or other surface being protected. This in turn reduces the overall cost to the owner of the facility by reducing the cost of replacing protective barrier systems and also by reducing the outage time needed for the replacement job.

Furthermore, the integrity and life span of the refractory lining of the protective barrier systems is increased because the tight or floating snap fit permits slight limited (controlled) movement of the V-anchor relative to the eye-mount. This in turn allows slight limited (controlled) movement of the refractory material lining, thus reducing cracking and failures due to the expansion and movement of the refractory lining material from thermal cycling.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the specific sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An eye mount for a refractory anchor, the eye mount comprising:
- a mounting base; and
- an attachment head extending from the mounting base, the attachment head comprising:
  - a through-hole, and
  - a saddle channel forming a recess within an outer upper surface of the attachment head, the saddle channel including:
    - two side portions formed integrally with the attachment head, and
    - a curved portion between the two side portions, the curved portion formed integrally with the attachment head, the curved portion including:
      - a first extension portion extending from a first one of the side portions; and
      - a flat portion extending from the first extension portion, wherein the flat portion is substantially parallel to a center axis of the through-hole.

2. The eye mount of claim 1, wherein the two side portions are recessed into opposing side surfaces of the attachment head.

3. The eye mount of claim 2, wherein the curved portion includes a second extension portion extending from the flat portion to a second one of the side portions, the flat portion defining an intersection portion between the two side portions.

4. The eye mount of claim 3, wherein the intersection portion and the two side portions form a portion of the through-hole.

5. The eye mount of claim 1, wherein the curved portion includes a second extension portion and the flat portion extends between the first extension portion and the second extension portion.

6. The eye mount of claim 1, wherein the attachment head includes protruding portions extending outwardly from opposing sides of the attachment head.

7. The eye mount of claim 6, wherein the two side portions are each recessed into a respective one of the protruding portions.

8. An eye mount comprising:
- a mounting base; and
- an attachment head extending from and formed integrally with the mounting base comprising:
  - a through-hole; and
  - a saddle channel forming a recess within an outer upper surface of the attachment head to define at least part of the through-hole, the saddle channel including:
    - two side portions, and
    - a curved portion between the two side portions, the curved portion including:
      - a first extension portion extending from a first one of the side portions; and
      - a flat portion extending from the first extension portion, wherein the flat portion is substantially parallel to a center axis of the through-hole.

9. The eye mount of claim 8, wherein the two side portions are recessed into opposing side surfaces of the attachment head.

10. The eye mount of claim 9, wherein the curved portion includes a second extension portion extending from the flat portion to a second one of the side portions, the flat portion defining an intersection portion between the two side portions.

11. The eye mount of claim 10, wherein the intersection portion and the two side portions form a portion of the through-hole.

12. The eye mount of claim 8, wherein the mounting base is in the form of a stud.

13. The eye mount of claim 8, wherein the attachment head includes protruding portions extending outwardly from opposing sides of the attachment head.

14. The eye mount of claim 13, wherein the two side portions are each recessed into a respective one of the protruding portions.

15. An anchoring assembly for a refractory material, the anchoring assembly comprising:
- an anchor including a pair of arm segments extending outwardly from opposing sides of a connecting segment;
- an eye mount including:
  - a mounting base;
  - a through-hole; and
  - an attachment head extending from the mounting base, wherein the attachment head and the mounting base are formed as a unitary component, and wherein the attachment head includes a saddle channel that is formed by two side portions and a curved portion arranged between the two side portions, and
- a spacer received within the through-hole, the spacer being disposed between the anchor and the eye mount;
- wherein the attachment head is configured to receive the connecting segment with a snap-fit connection.

16. The anchoring assembly of claim 15, wherein the connecting segment defines a U-shape.

17. The anchoring assembly of claim 15, wherein the two side portions are recessed into opposing side surfaces of the attachment head.

18. The anchoring assembly of claim 17, wherein the saddle channel includes an intersection portion connected between the two side portions and the spacer defines a flat portion configured to contact the intersection portion.

19. The anchoring assembly of claim 15, wherein the curved portion includes:

a first extension portion extending from a first one of the side portions; and a flat portion extending from the first extension portion, wherein the flat portion is substantially parallel to a center axis of the through-hole and the spacer is configured to contact the flat portion.

20. The anchoring assembly of claim 15, wherein the saddle channel forms a recess within an outer upper surface of the attachment head.

* * * * *